United States

Takahashi, Yasuo

[11] 3,975,091
[45] Aug. 17, 1976

[54] WIDE ANGLE PHOTOGRAPHIC LENS
[75] Inventor: Takahashi, Yasuo, Tokyo, Japan
[73] Assignee: Asahi Kogaku Kogyo Kabushiki Kaisha, Tokyo, Japan
[22] Filed: Apr. 21, 1975
[21] Appl. No.: 570,149

[30] Foreign Application Priority Data
Apr. 25, 1974  Japan................................ 49-47031

[52] U.S. Cl. .................................................. 350/214
[51] Int. Cl.² ............................................ G02B 9/00
[58] Field of Search...................... 350/214, 176, 177

[56] References Cited
UNITED STATES PATENTS
3,635,546  1/1972  Mori ............................... 350/214
3,844,640  10/1974  Nakagawa........................... 350/214
3,884,556  5/1975  Nakagawa........................... 350/214

Primary Examiner—John K. Corbin
Assistant Examiner—Conrad Clark
Attorney, Agent, or Firm—Sughrue, Rothwell, Mion, Zinn & Macpeak

[57] ABSTRACT

A wide angle photograhic lens which has the back focal distance of 1.2 to 1.4 times as long as the focal length comprising seven lens components constituted by seven lenses in which the first lens is a positive lens the face of which of greater curvature is on the object side, the second and third lenses are negative meniscus lenses convex to the object side, the fourth lens is a positive lens, the fifth lens is a negative lens, the sixth lens is a positive meniscus lens convex to the image side, and the seventh lens is a positive lens, wherein the following conditions are satisfied:

$$\frac{F}{0.35} < F_1 < \frac{F}{0.2} \qquad (1)$$

$$\frac{F}{1.2} < |F_{1,2,3}| < \frac{F}{0.7} \cdot F_{1,2,3} < 0 \qquad (2)$$

$$0.7 < \frac{d_1 + d_2 + d_3 + d_4 + d_5 + d_6}{d_7 + d_8 + d_9 + d_{10} + d_{11} + d_{12} + d_{13}} < 1.2 \qquad (3)$$

$$\frac{F}{1.0} < F_{1,2,3,4} < \frac{F}{0.5} \qquad (4)$$

2 Claims, 10 Drawing Figures

FIG.1
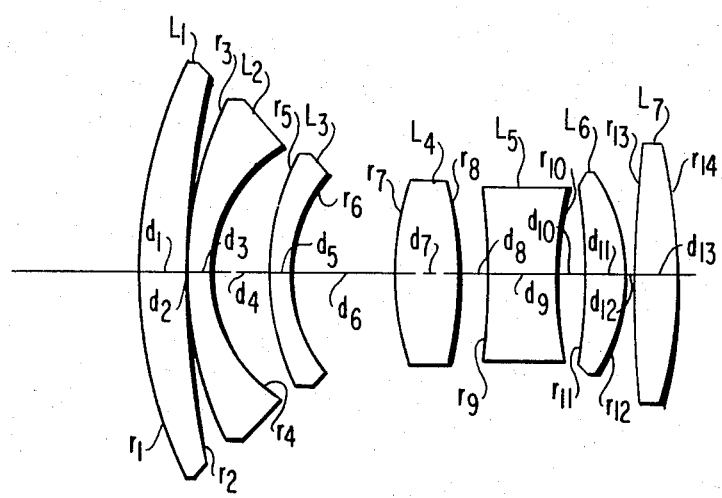
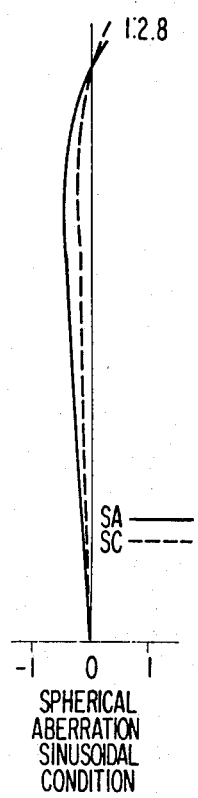
FIG.2a
SPHERICAL ABERRATION SINUSOIDAL CONDITION
SA ——
SC ----
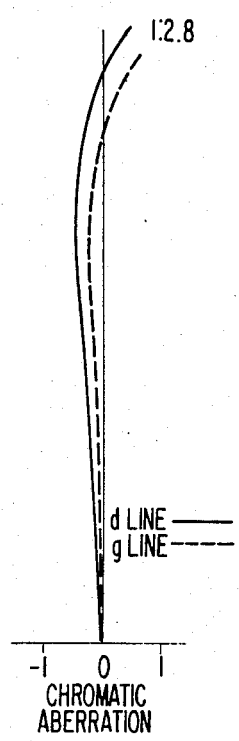
FIG.2b
CHROMATIC ABERRATION
d LINE ——
g LINE ----
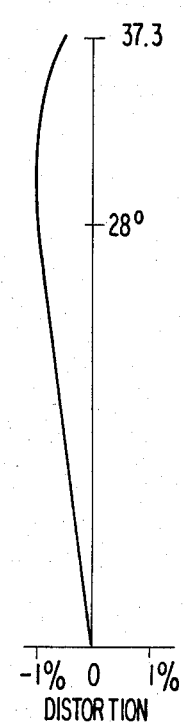
FIG.2c
DISTORTION
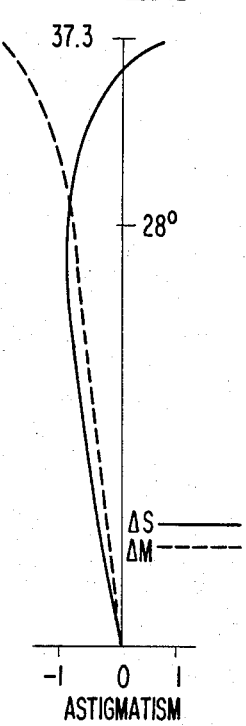
FIG.2d
ASTIGMATISM
ΔS ——
ΔM ----

SPHERICAL
ABERRATION
SINUSOIDAL
CONDITION

CHROMATIC
ABERRATION

DISTORTION

ASTIGMATISM

WIDE ANGLE PHOTOGRAPHIC LENS

SUMMARY OF THE INVENTION

In the retrofocus type wide angle lens in which the back focal distance is longer than 1.2 times as long as the focal length, the distortion is apt to be increased. The present invention relates to a compact wide angle lens in which the above defects are eliminated, and more particularly to a wide angle photographic lens which has the back focal distance of 1.2 to 1.4 times as long as the focal length comprising seven lens components constituted by seven lenses in which the first lens is a positive lens the face of which of greater curvature is on the object side, the second and third lenses are negative meniscus lenses convex to the object side, the fourth lens is a positive lens, the fifth lens is a negative lens, the sixth lens is a positive meniscus lens convex to the image side, and the seventh lens is a positive lens, wherein the following conditions are satisfied:

$$\frac{F}{0.35} < F_1 < \frac{F}{0.2} \tag{1}$$

$$\frac{F}{1.2} < |F_{1,2,3}| < \frac{F}{0.7}, \quad F_{1,2,3} < 0 \tag{2}$$

$$0.7 < \frac{d_1 + d_2 + d_3 + d_4 + d_5 + d_6}{d_7 + d_8 + d_9 + d_{10} + d_{11} + d_{12} + d_{13}} < 1.2 \tag{3}$$

$$\frac{F}{1.0} < F_{1,2,3,4} < \frac{F}{0.5} \tag{4}$$

BRIEF DESCRIPTION OF THE DRAWINGS

The specific nature of the invention, as well as other objects, aspects, uses and advantages thereof, will clearly appear from the following description and from the accompanying drawings, in which:

FIG. 1 is a longitudinal view of an embodiment of the lens system of the present invention;

FIGS. 2a to 2d show aberration curves obtained by the lens system in accordance with the embodiment illustrated in FIG. 1;

DESCRIPTION OF THE PREFERRED EMBODIMENTS

Figure 3:
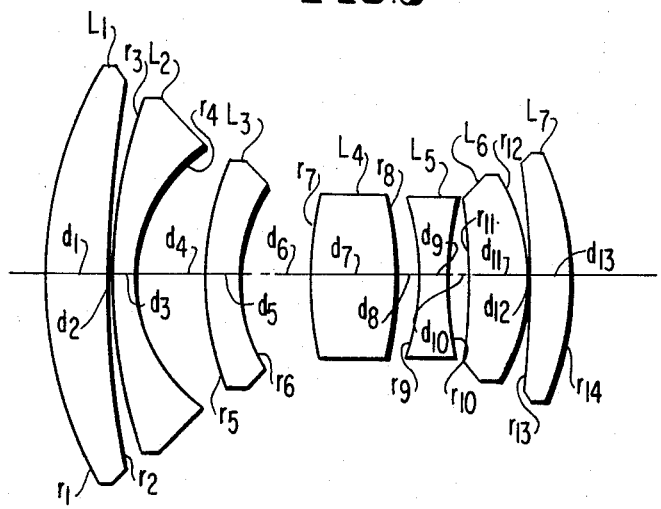
FIG. 3 is a longitudinal view of another embodiment of the invention.

Describing the construction of the lens system of the invention, the first lens is a positive lens the face of which of greater curvature is on the object side, the second and third lenses are negative meniscus lenses convex to the object side, the fourth lens is a positive lens, the fifth lens is a negative lens, the sixth lens is a positive meniscus lens convex to the image side, the sixth lens is a positive meniscus lens convex to the image side, and the seventh lens is a positive lens. The lens system as described above satisfies the following conditions wherein the reference characters are defined as follows:

F: effective focal length of the lens system $F_{1,2,\ldots,i}$: effective focal length of the lens system comprising the first to the $i$-th lenses $r_j$: radii of curvature of the $j$-th face $d_k$: axial air separations or thicknesses of the $k$-th air separation or lens thickness $n_i$: refractive indices for the sodium $d$-line of the $i$-th lens $\nu_i$: Abbe numbers of the $i$-th lens $f_B$: back focal distance, Conditions:

$$\frac{F}{0.35} < F_1 < \frac{F}{0.2} \tag{1}$$

$$\frac{F}{1.2} < |F_{1,2,3}| < \frac{F}{0.7}, \quad F_{1,2,3} < 0 \tag{2}$$

$$0.7 < \frac{d_1 + d_2 + d_3 + d_4 + d_5 + d_6}{d_7 + d_8 + d_9 + d_{10} + d_{11} + d_{12} + d_{13}} < 1.2 \tag{3}$$

$$\frac{F}{1.0} < F_{1,2,3,4} < \frac{F}{0.5} \tag{4}$$

The first conditions (1) are to be satisfied for correction for distortion and for making the lens system compact. When $F_1$ is shorter than $F/0.35$, the correction for distortion can be made easily. However, the burden loaded on the second and third lenses to make the back focal distance long and make the angle of field large increases, which results in increase in coma aberration and reduction in Petzval sum by making the curvature of the fourth and sixth faces too great. Thus, it becomes difficult to make correction for aberrations by the rear half portion of the lens system. When $F_1$ is longer than $F/0.2$, the desired results cannot be obtained easily.

The second conditions (2) are to be satisfied for obtaining the desirable back focal distance by determining the refractive index or negativeness of the front lens component of the lens system with reference to the air separation $d_6$. When $F_{1,2,3}$ is negative and smaller than $F/1.2$, the long back focal distance can easily be obtained. However, on the other hand, the burden loaded on the rear positive lens component increases and chromatic aberration and other aberrations are degraded. When the value defined becomes larger than $F/0.7$, the air separation $d_6$ must be enlarged to make the back focal distance long or the rear lens component must be designed to obtain the long back focal distance. If the separation $d_6$ is enlarged, the lens system cannot be made compact. If the rear lens component is designed to obtain the long back focal distance, various aberrations are degraded and it becomes difficult to obtain the large angle of field and the large aperture diameter.

The third conditions (3) are to be satisfied for making the whole length of the lens system small. If the ratio defined is smaller than 0.7, the back focal distance is reduced. If the other part is designed to obtain a long back focal distance, the correction for aberrations becomes difficult. If it becomes larger than 1.2, the whole lens system cannot be made compact.

The fourth conditions (4) are to be satisfied for good correction of aberrations while maintaining a long back focal distance. When $F_{1,2,3,4}$ is shorter than $F/1.0$, Petzval sum is apt to be reduced. If the reduction of Petzval sum is tried to be compensated for by the other part of the lens system, the sixth and seventh lenses cause degradation of aberration especially with respect to spherical aberration. When it is longer than $F/0.5$, the lens system is degraded with respect to chromatic aberration and it becomes necessary for instance to increase the refractive power of the fifth lens, which results in reduction of Petzval sum, degradation of chromatic and spherical aberration and difficulty in making a large angle of field.

Two specific examples of the present invention will be described hereinbelow.

The first example is shown in FIG. 1 and consists of a first lens $L_1$, which is a positive meniscus lens convex to the object, second and third lenses $L_2$ and $L_3$, which are both negative meniscus lenses convex to the object, a fourth lens $L_4$, which is a positive biconvex lens, a negative biconcave fifth lens $L_5$, a sixth lens $L_6$, which is a positive meniscus lens convex to the image, and seventh positive biconvex lens $L_7$. The radii $r_1$ to $r_{14}$ and the thicknesses and separations $d_1$ to $d_{13}$, along with the refractive indices $n_1$ to $n_7$ and Abbe numbers $\nu_1$ to $\nu_7$ for lenses $L_1$ to $L_7$ are given in Table 1 as follows:

Table 1

$F = 100$ $F_1 = 357.1 = \dfrac{F}{0.28}$ $F_{1.2.3} = -96.47 = \dfrac{F}{-1.036}$ $F_{1.2.3.4} = 132.8 = \dfrac{F}{0.753}$ $f_B = 1.33\ F$

| Lens | Radius of Curvature r | Lens thickness or Distance d | Refractive Index n | Abbe No. $\nu$ |
|---|---|---|---|---|
| $L_1$ | $r_1 = 128.85$ | | | |
| | | $d_1 = 14.46$ | $n_1 = 1.69895$ | $\nu_1 = 30.1$ |
| | $r_2 = 241.70$ | | | |
| | | $d_2 = 0.35$ | | |
| $L_2$ | $r_3 = 101.75$ | | | |
| | | $d_3 = 7.12$ | $n_2 = 1.64000$ | $\nu_2 = 60.2$ |
| | $r_4 = 42.44$ | | | |
| | | $d_4 = 16.70$ | | |
| $L_3$ | $r_5 = 75.03$ | | | |
| | | $d_5 = 7.12$ | $n_3\ 1.51633$ | $\nu_3 = 64.1$ |
| | $r_6 = 41.73$ | | | |
| | | $d_6 = 30.95$ | | |
| $L_4$ | $r_7 = 107.63$ | | | |
| | | $d_7 = 18.91$ | $n_4 = 1.73400$ | $\nu_4\ 51.5$ |
| | $r_8 = 108.57$ | | | |
| | | $d_8 = 9.47$ | | |
| $L_5$ | $r_9 = -171.54$ | | | |
| | | $d_9 = 17.15$ | $n_5 = 1.80518$ | $\nu_5 = 25.4$ |
| | $r_{10} = 118.06$ | | | |
| | | $d_{10} = 9.62$ | | |
| $L_6$ | $r_{11} = -146.41$ | | | |
| | | $d_{11} = 10.56$ | $n_6 = 1.60311$ | $\nu_6 = 60.7$ |
| | $r_{12} = -56.83$ | | | |
| | | $d_{12} = 3.51$ | | |
| $L_7$ | $r_{13} = 393.39$ | | | |
| | | $d_{13} = 12.84$ | $n_7 = 1.60311$ | $\nu_7 = 60.7$ |
| | $r_{14} = -149.49$ | | | |

FIG. 2a shows the spherical aberration and sine condition; FIG. 2b shows the chromatic aberration; FIG. 2c shows the distortion, and FIG. 2d shows the astigmatism of the lens system shown in FIG. 1 and defined in Table 1.

The second example is shown in FIG. 3, and consists of a first lens $L_1$, which is a positive meniscus lens convex to the object, second and third lenses $L_2$ and $L_3$, which are convex to the object, a fourth lens $L_4$, which is a positive biconvex lens, a negative biconcave fifth lens $L_5$, a sixth lens $L_6$ and a seventh lens $L_7$, both of which are positive meniscus lenses convex to the image. The radii $r_1$ to $r_{14}$ and the thicknesses and separations $d_1$ to $d_{13}$, along with the refractive indices $n_1$ to $n_7$ and Abbe numbers $\nu_1$ to $\nu_7$ are given in Table 2 as follows:

Table 2

$F = 100$ $F_1 = 312.3 = \dfrac{F}{0.32}$ $F_{1.2.3} = -114.7 = \dfrac{F}{-0.87}$ $F_{1.2.3.4} = 111.7 = \dfrac{F}{0.895}$ $f_B = 1.24 F$

| Lens | Radius of Curvature r | Lens Thickness or Distance d | Refractive index n | Abbe No. $\nu$ |
|---|---|---|---|---|
| $L_1$ | $r_1 = 103.06$ | | | |
| | | $d_1 = 18.32$ | $n_1 = 1.54869$ | $\nu_1 = 45.6$ |
| | $r_2 = 242.85$ | | | |
| | | $d_2 = 0.67$ | | |
| $L_2$ | $r_3 = 134.42$ | | | |
| | | $d_3 = 6.66$ | $n_2 = 1.51633$ | $\nu_2 = 64.1$ |
| | $r_4 = 43.13$ | | | |
| | | $d_4 = 20.29$ | | |
| $L_3$ | $r_5 = 72.64$ | | | |
| | | $d_5 = 9.99$ | $n_3 = 1.48749$ | $\nu_3 = 70.1$ |
| | $r_6 = 41.77$ | | | |
| | | $d_6 = 20.89$ | | |
| $L_4$ | $r_7 = 94.05$ | | | |
| | | $d_7 = 24.29$ | $n_4 = 1.80610$ | $\nu_4 = 40.8$ |
| | $r_8 = -117.12$ | | | |
| | | $d_8 = 7.20$ | | |
| $L_5$ | $r_9 = -74.42$ | | | |
| | | $d_9 = 8.76$ | $n_5 = 1.80518$ | $\nu_5 = 25.4$ |
| | $r_{10} = 142.21$ | | | |
| | | $d_{10} = 4.06$ | | |
| $L_6$ | $r_{11} = -223.20$ | | | |
| | | $d_{11} = 17.46$ | $n_6 = 1.65160$ | $\nu_6 = 58.6$ |
| | $r_{12} = -53.97$ | | | |
| | | $d_{12} = 0.33$ | | |
| $L_7$ | $r_{13} = -339.80$ | | | |
| | | $d_{13} = 12.29$ | $n_7 = 1.65160$ | $\nu_7 = 58.6$ |
| | $r_{14} = -86.35$ | | | |

Figure 4A:
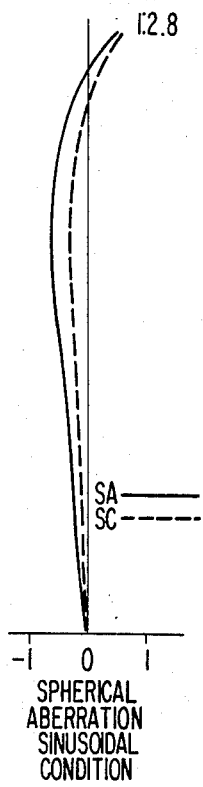
FIGS. 4a to 4d show aberration curves obtained by the lens system in accordance with the embodiment illustrated in FIG. 3.
Figure 4B:
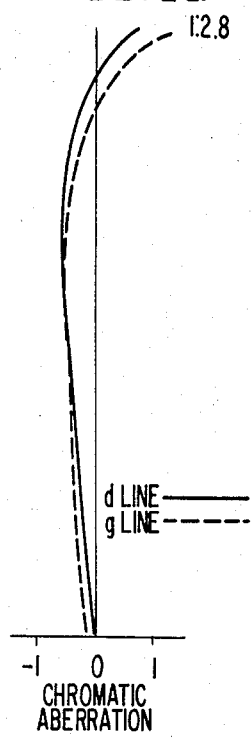
Figure 4C:
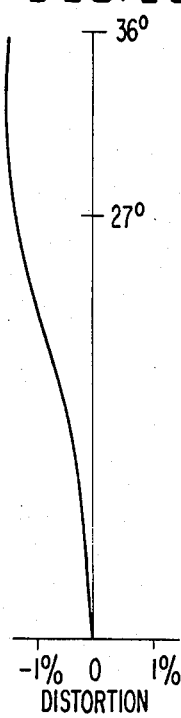
Figure 4D:
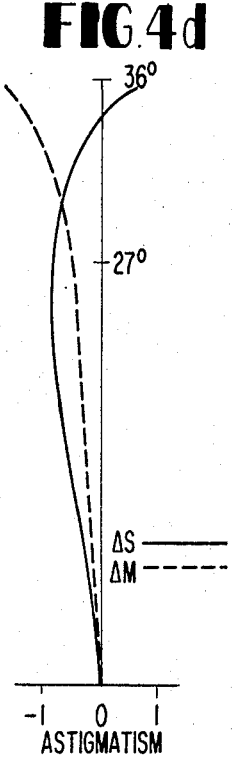

FIG. 4a shows the spherical aberration and sine condition; FIG. 4b shows the chromatic aberration; FIG. 4c shows the distortion; and, FIG. 4d shows astigmatism of the lens system shown in FIG. 3 and defined in Table 2.

It will be apparent that the embodiments shown are only exemplary and that various modifications can be made in construction and arrangement within the scope of the invention as defined in the appended claims.

What is claimed is:

1. A wide angle photographic lens having a back focal distance of 1.33 times as long as the focal length comprising seven lens components constituted by seven lenses which satisfies the following four conditions:

$$\dfrac{F}{0.35} < F_1 < \dfrac{F}{0.2} \qquad (1)$$

$$\dfrac{F}{1.2} < |F_{1.2.3}| < \dfrac{F}{0.7}\ F_{1.2.3} < 0 \qquad (2)$$

$$0.7 < \dfrac{d_1 + d_2 + d_3 + d_4 + d_5 + d_6}{d_7 + d_8 + d_9 + d_{10} + d_{11} + d_{12} + d_{13}} < 1.2 \qquad (3)$$

$$\dfrac{F}{1.0} < F_{1.2.3.4} < \dfrac{F}{0.5} \qquad (4)$$

wherein the characters designate dimensions as follows:

F: effective focal length of the lens system, $F_{1.2\ \ldots\ i}$: effective focal length of the lens system comprising the first to the $i$-th lenses, and $d_k$: axial air separations or thicknesses of the $k$-th air separation or lens thickness, wherein the first lens is a positive lens the face of which of greater curvature is on the object side, the second and third lenses are negative meniscus lenses convex to the object side, the fourth lens is a positive lens, the fifth lens is a negative lens, the sixth lens is a positive meniscus lens convex to the image side, and the seventh lens is a biconvex lens, and wherein the radii $r_1$ to $r_{14}$, the thickness and separation $d_1$ to $d_{13}$, the refractive indices $n_1$ to $n_7$, and Abbe numbers $\nu_1$ to $\nu_7$ of said first to seventh lenses $L_1$ to $L_7$, respectively, satisfy the following conditions:

$F = 100$ $F_1 = 357.1 = \dfrac{F}{0.28}$ $F_{1,2,3} = -96.47 = \dfrac{F}{-1.036}$ $F_{1,2,3,4} = 132.8 = \dfrac{F}{0.753}$ $[f_B = 1.33F]$

| Lens | Radius of Curvature r | Lens Thickness or Distance d | Refractive Index n | Abbe No. $\nu$ |
|---|---|---|---|---|
| $L_1$ | $r_1 = 128.85$ | $d_1 = 14.46$ | $n_1 = 1.69895$ | $\nu_1 = 30.1$ |
| | $r_2 = 241.70$ | $d_2 = 0.35$ | | |
| $L_2$ | $r_3 = 101.75$ | $d_3 = 7.12$ | $n_2 = 1.64000$ | $\nu_2 = 60.2$ |
| | $r_4 = 42.44$ | $d_4 = 16.70$ | | |
| $L_3$ | $r_5 = 75.03$ | $d_5 = 7.12$ | $n_3 = 1.51633$ | $\nu_3 = 64.1$ |
| | $r_6 = 41.73$ | $d_6 = 30.95$ | | |
| $L_4$ | $r_7 = 107.63$ | $d_7 = 18.91$ | $n_4 = 1.73400$ | $\nu_4 = 51.5$ |
| | $r_8 = -108.57$ | $d_8 = 9.47$ | | |
| $L_5$ | $r_9 = -171.54$ | $d_9 = 17.15$ | $n_5 = 1.80518$ | $\nu_5 = 25.4$ |
| | $r_{10} = 118.06$ | $d_{10} = 9.62$ | | |
| $L_6$ | $r_{11} = -146.41$ | $d_{11} = 10.56$ | $n_6 = 1.60311$ | $\nu_6 = 60.7$ |
| | $r_{12} = -56.83$ | $d_{12} = 3.51$ | | |
| $L_7$ | $r_{13}$ 393.39 | $d_{13} = 12.84$ | $n_7 = 1.60311$ | $\nu_7 = 60.7$ |
| | $r_{14} = -149.49$ | | | |

2. A wide angle photographic lens having a back focal distance of 1.24 times as long as the focal length comprising seven lens components constituted by seven lenses which satisfies the following conditions:

$$\dfrac{F}{0.35} < F_1 < \dfrac{F}{0.2} \quad (1)$$

$$\dfrac{F}{1.2} < |F_{1,2,3}| < \dfrac{F}{0.7} \cdot F_{1,2,3} < 0 \quad (2)$$

$$0.7 < \dfrac{d_1 + d_2 + d_3 + d_4 + d_5 + d_6}{d_7 + d_8 + d_9 + d_{10} + d_{11} + d_{12} + d_{13}} < 1.2 \quad (3)$$

$$\dfrac{F}{1.0} < F_{1,2,3,4} < \dfrac{F}{0.5} \quad (4)$$

wherein the characters designate dimensions as follows:

F: effective focal length of the lens system,
$F_{1,2 \ldots i}$: effective focal length of the lens system comprising the first to the $i$-th lenses, and
$d_k$: axial air separations or thicknesses of the $k$-th air separation or lens thickness, wherein the first lens is a positive lens the face of which of greater curvature is on the object side, the second and third lenses are negative meniscus lenses convex to the object side, the fourth lens is a positive lens, the fifth lens is a negative lens, the sixth lens is a positive meniscus lens convex to the image side, and the seventh lens is a positive meniscus lens convex to the image side lens, and wherein the radii $r_1$ to $r_{14}$, the thickness and separations $d_1$ to $d_{13}$, the refractive indices $n_1$ to $n_7$, and the Abbe numbers $\nu_1$ to $\nu_7$ of said first to seventh lenses $L_1$ to $L_7$, respectively, satisfy the following conditions:

$F = 100$ $F_1 = 312.3 = \dfrac{F}{0.32}$ $F_{1,2,3} = -114.7 = \dfrac{F}{-0.87}$ $F_{1,2,3,4} = 111.7 = \dfrac{F}{0.895}$ $[f_B = 1.24F]$

| Lens | Radius of Curvature r | Lens Thickness or Distance d | Refractive Index n | Abbe No. $\nu$ |
|---|---|---|---|---|
| $L_1$ | $r_1 = 103.06$ | $d_1 = 18.32$ | $n_1 = 1.54869$ | $\nu_1 = 45.6$ |
| | $r_2 = 242.85$ | $d_2 = 0.67$ | | |
| $L_2$ | $r_3 = 134.42$ | $d_3 = 6.66$ | $n_2 = 1.51633$ | $\nu_2 = 64.1$ |
| | $r_4 = 43.13$ | $d_4 = 20.29$ | | |
| $L_3$ | $r_5 = 72.64$ | $d_5 = 9.99$ | $n_3 = 1.48749$ | $\nu_3 = 70.1$ |
| | $r_6 = 41.77$ | $d_6 = 20.89$ | | |
| $L_4$ | $r_7 = 94.05$ | $d_7 = 24.29$ | $n_4 = 1.80610$ | $\nu_4 = 40.8$ |
| | $r_8 = -117.12$ | $d_8 = 7.20$ | | |
| $L_5$ | $r_9 = -74.42$ | $d_9 = 8.76$ | $n_5 = 1.80518$ | $\nu_5 = 25.4$ |
| | $r_{10} = 142.21$ | $d_{10} = 4.06$ | | |
| $L_6$ | $r_{11} = -223.20$ | $d_{11} = 17.46$ | $n_6 = 1.65160$ | $\nu_6 = 58.6$ |
| | $r_{12} = -58.97$ | $d_{12} = 0.33$ | | |
| $L_7$ | $r_{13} = -339.80$ | $d_{13} = 12.29$ | $n_7 = 1.65160$ | $\nu_7 = 58.6$ |
| | $r_{14} = -86.35$ | | | |

\* \* \* \* \*